US006958024B2

(12) United States Patent
Takano

(10) Patent No.: US 6,958,024 B2
(45) Date of Patent: Oct. 25, 2005

(54) AUTOMOTIVE V-BELT NONSTAGE TRANSMISSION

(75) Inventor: Kiyohito Takano, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 156 days.

(21) Appl. No.: 10/422,857

(22) Filed: Apr. 25, 2003

(65) Prior Publication Data

US 2004/0214668 A1 Oct. 28, 2004

(51) Int. Cl.$^7$ .......................... F16H 59/00; F16H 55/56
(52) U.S. Cl. ............................ 474/14; 474/46; 474/28; 474/12
(58) Field of Search .............................. 474/11–15, 36, 474/38, 42, 46, 69, 70

(56) References Cited

U.S. PATENT DOCUMENTS

| | | | | |
|---|---|---|---|---|
| 2,611,277 A | * | 9/1952 | Mitchell | 474/36 |
| 4,826,467 A | * | 5/1989 | Reese et al. | 474/14 |
| 5,358,450 A | * | 10/1994 | Robert | 474/13 |
| 5,460,575 A | * | 10/1995 | Berto | 474/11 |
| 6,149,540 A | * | 11/2000 | Johnson et al. | 474/14 |
| 6,811,504 B2 | * | 11/2004 | Korenjak et al. | 474/14 |

FOREIGN PATENT DOCUMENTS

| | | | | |
|---|---|---|---|---|
| EP | 0898096 A1 | * | 2/1999 | ........... F16H 55/56 |
| JP | 06-330995 A | * | 11/1994 | ............ F16H 9/18 |
| JP | B2 2620490 | | 3/1997 | |
| JP | A 11-165686 | | 6/1999 | |

* cited by examiner

Primary Examiner—Marcus Charles
(74) Attorney, Agent, or Firm—Oliff & Berridge, PLC

(57) ABSTRACT

An automotive V-belt nonstage transmission includes a drive pulley having a fixed sheave fixedly mounted on a drive shaft, a movable sheave mounted on the drive shaft, a return coil spring, a flyweight mechanism, a collar being rotatable relative to the fixed and movable sheaves is mounted rotatably on the drive shaft, and a one-way clutch mounted between the collar and the drive shaft interlocks the collar and the drive shaft so that only the rotation of the collar in the normal rotating direction is transmitted to the drive shaft. The collar has an outer surface serving as a bottom surface of a V-groove defined by the respective conical pressure surfaces of the fixed and the movable sheave of the drive pulley, and a conical surface forming a central part, around the drive shaft, of the conical pressure surface of the fixed sheave of the drive pulley.

7 Claims, 8 Drawing Sheets

US 6,958,024 B2

AUTOMOTIVE V-BELT NONSTAGE TRANSMISSION

BACKGROUND

1. Field of the Disclosure

The disclosure relates to an automotive V-belt nonstage transmission for a vehicle, such as a motorcycle or an all-terrain four-wheel vehicle.

2. Description of the Related Art

An automotive V-belt nonstage transmission of the kind is required, in view of improving the operability of a vehicle, to have a clutch function to prevent the excessive creeping of the vehicle while an engine mounted on the vehicle is idling, and an engine-brake effectuating function to effectuate engine brake while the engine is idling. Various V-belt nonstage transmissions capable of effectuating engine brake when necessary to meet both those requirements have been developed. FIGS. 7 and 8 show such a known V-belt nonstage transmission.

Referring to FIG. 7, the known V-belt nonstage transmission is provided with a drive pulley 1 capable of serving as a clutch and including a drive shaft 6 coupled with a crankshaft 5 included in an engine, a fixed sheave 10 fixedly mounted on the drive shaft 6, and a movable sheave 11 axially movably mounted on the drive shaft 6. The fixed sheave 10 and the movable sheave 11 have conical pressure surfaces 10a and 11a, respectively. The conical pressure surfaces 10a and 11a define a V-groove 19. The outer surface 6a of the drive shaft 6 serves as the bottom surface of the V-groove 19. A disk-shaped support member 30 is connected to the back surface of the movable sheave 11 by a connecting arm 31. A flyweight mechanism 9 includes flyweights 37, a spider 38 and rollers 39. The spider 38 is screwed on the drive shaft 6 and is engaged circumferentially with the connecting arm 31. Thus, the movable sheave 11 rotates always together with the drive shaft 6. The flyweights 37 are pivotally supported on the movable sheave 11 by pins 41 so as to be radially swingable on the pins 41 and in contact with the rollers 39. A return coil spring 42 is compressed between the spider 38 and the support member 30 to push the movable sheave 11 in an expanding direction to expand the V-groove 19, i.e., to the right. The support member 30 is mounted on a bearing metal 33 put on the drive shaft 6 so as to be axially movable on the drive shaft 6. A bearing 80 is fitted in the boss of the support member 30, an annular plate 82 is placed in contact with the boss of the support member 30 via the bearing 80, and a control lever 81 for controlling engine brake is disposed opposite to the annular plate 82. The outer most position, i.e., the right end position as viewed in FIG. 7, of the support member 30 can be adjusted by the control lever 81.

While the engine is idling, the control lever 81 is moved to the right to separate the pressure surface 11a of the movable sheave 11 from a side contact surface 3a of a V belt 3 as shown in FIG. 7. In this state, the clutch is disengaged. When the vehicle runs down a slope with the engine operating at an idling speed, the control lever 81 is shifted in a narrowing direction to narrow the V-groove 19, i.e., to the left to compress the V belt 3 between the respective pressure surfaces 10a and 11a of the fixed sheave 10 and the movable sheave 11 of the pulley 1, so that engine brake is effectuated.

Referring to FIG. 8 showing a lever type engine brake control mechanism for operating and controlling the control lever 81, a lever support shaft 100 has one end part on which the control lever 81 is mounted and the other end part on which a swing link 101 is fixedly mounted. A torsion coil spring 102 wound around the lever support shaft 100 presses the control lever 81 against the annular plate 83 so that the movable sheave 11 is pressed against the V belt 3 to compress the V belt 3 between the fixed sheave 10 and the movable sheave 11. A collar 107 attached to the swing link 101 is engaged with an eccentric output shaft 106 of an electric motor 105. A control unit 110 has an output part connected to the electric motor 105, and an input part connected by a cable to a speed sensor, not shown, a traveling direction sensor, not shown. A V-belt nonstage transmission provided with a cam-and-lever type engine brake system is disclosed in JP11-165686A instead of the lever type system described above.

Another known automotive V-belt nonstage transmission disclosed in Japanese Patent No. 2620490 is provided with a drive pulley having a fixed sheave connected by a one-way clutch to a drive shaft, a movable sheave, a clutch mechanism disposed between the fixed and the movable sheave, and an auxiliary coil spring for keeping the cutch mechanism engaged. The clutch mechanism is engaged and disengaged by the axial movement of the movable sheave of the drive pulley.

The V-belt nonstage transmission provided with the lever type engine brake control mechanism as shown in FIGS. 7 and 8 has the following problems.

(1) The control lever 81 and the associated parts must be formed in high dimensional accuracies and must be processed and assembled very accurately, which increases the manufacturing cost.

(2) The V-belt nonstage transmission needs many additional parts including the electric motor 105, i.e., an actuator, and the control unit for controlling the electric motor 105, which increases the cost of the V-belt nonstage transmission.

(3) Since those additional parts are disposed around the drive pulley, a large space must be formed around the drive pulley, which unavoidably enlarges the V-belt nonstage transmission.

The V-belt nonstage transmission disposed in Japanese Patent No. 2620490 has the following problems.

(1) The clutch mechanism engages gradually and hence it is difficult to determine a clutch engaging engine speed accurately, and dogs of the clutch mechanism strike against each other to generate unpleasant mechanical noise.

(2) The clutch mechanism is liable to disengage if the resilient force of the auxiliary coil spring for keeping the clutch mechanism engaged is small, and the auxiliary coil spring affects speed change ratio if the resilient force of the auxiliary coil spring is increased.

SUMMARY

Accordingly, one aspect of the disclosure is to provide a compact automotive V-belt nonstage transmission, for transmitting the power of an engine, capable of maintaining a clutch function and effectuating engine brake while the engine is operating at an idling speed, having fewer parts, and capable of being manufactured at a low manufacturing cost.

According to one aspect of the disclosure, an automotive V-belt nonstage transmission comprises a drive pulley having a fixed sheave fixedly mounted on a drive shaft and having a conical pressure surface, a movable sheave mounted on the drive shaft, restrained from rotation relative to the drive shaft, capable of axially moving on the drive shaft and having a conical pressure surface; a driven pulley; a V belt extended between the drive and the driven pulley;

a return coil spring pushing the movable sheave of the drive pulley so as to part from the fixed sheave; a flyweight mechanism capable of pushing the movable sheave of the drive pulley toward the fixed sheave of the drive pulley as rotating speed of the drive shaft increases; and a clutch mechanism including a collar being rotatable relative to the fix and movable sheaves and mounted between the drive shaft and the drive pulley, and a one-way clutch mounted between the drive shaft and the collar, interlocking the collar and the drive shaft and capable of transmitting only rotation of the collar in the normal rotating direction to the drive shaft, and the collar has an outer periphery surface serving as a bottom surface of a V-groove defined by the respective conical pressure surfaces of the fixed and the movable sheave of the drive pulley, and a conical surface forming a central part, around the drive shaft, of the conical pressure surface of the fixed sheave of the drive pulley.

The automotive V-belt nonstage transmission according to the disclosure may further comprise an auxiliary coil spring capable of counterbalancing centrifugal force produced by the flyweight mechanism while the engine is operating at an idling speed in which the movable sheave of the drive pulley is at least in contact with a side contact surface of the V belt.

In the automotive V-belt nonstage transmission according to the disclosure, the auxiliary coil spring may surround a part of the return coil spring and may have a resilient force lower than that of the return coil spring, and the return coil spring and the auxiliary coil spring may be connected in series by an annular connecting member having a stepped cross section.

While a vehicle provided with the engine is stopped and the engine is idling, the side contact surfaces of the V belt are in contact with the pressure surface of the movable sheave and the conical surface of the collar, and the inner surface of the V belt is in contact with the outer periphery surface of the collar. However, the rotation of the drive shaft in the normal rotating direction is not transmitted to the collar, the torque of the drive shaft acting in the normal rotating direction is not transmitted to the collar. Consequently, the vehicle remains stopped and the collar and the V belt are kept stopped even if the movable sheave of the drive pulley is in contact with the V belt. Thus, the clutch function of the automotive V-belt nonstage transmission is ineffective and the creep of the vehicle is suppressed.

When the driving force of the wheels acts on the automotive V-belt nonstage transmission when the vehicle travels down a slope with the engine operating at the idling speed, the V belt drives the movable sheave of the drive pulley for rotation at rotating speeds higher than the rotating speed of the drive shaft, the collar drives the drive shaft through the one-way clutch to effectuate engine brake.

In the case that the auxiliary coil spring is provided, the auxiliary coil spring counterbalances the centrifugal force produced by the flyweight mechanism while the engine is idling, pressure pressing the movable sheave of the drive pulley against the V belt while the engine is idling can be regulated only by the auxiliary coil spring.

In the case that the auxiliary coil spring surrounds a part of the return coil spring and the annular connecting member connects the auxiliary coil spring and the return coil spring, dimensional increase in the direction of the axis of the drive shaft can be prevented.

Since the clutch mechanism for maintaining a clutch function and effectuating engine brake includes substantially only the collar and the one-way clutch, the clutch mechanism needs fewer part and can be manufactured at a lower manufacturing cost than the known clutch mechanism using the lever, or the one-way clutch and the clutch mechanism.

Since the collar and the one-way clutch are incorporated into the drive pulley, the drive pulley and the related parts can be compactly arranged to avoid enlarging the automotive V-belt nonstage transmission.

BRIEF DESCRIPTION OF THE DRAWINGS

The above and other objects, features and advantages of the disclosure will become more apparent from the following description taken in connection with the accompanying drawings, in which.

DESCRIPTION OF THE PREFERRED EMBODIMENTS

Figure 1:
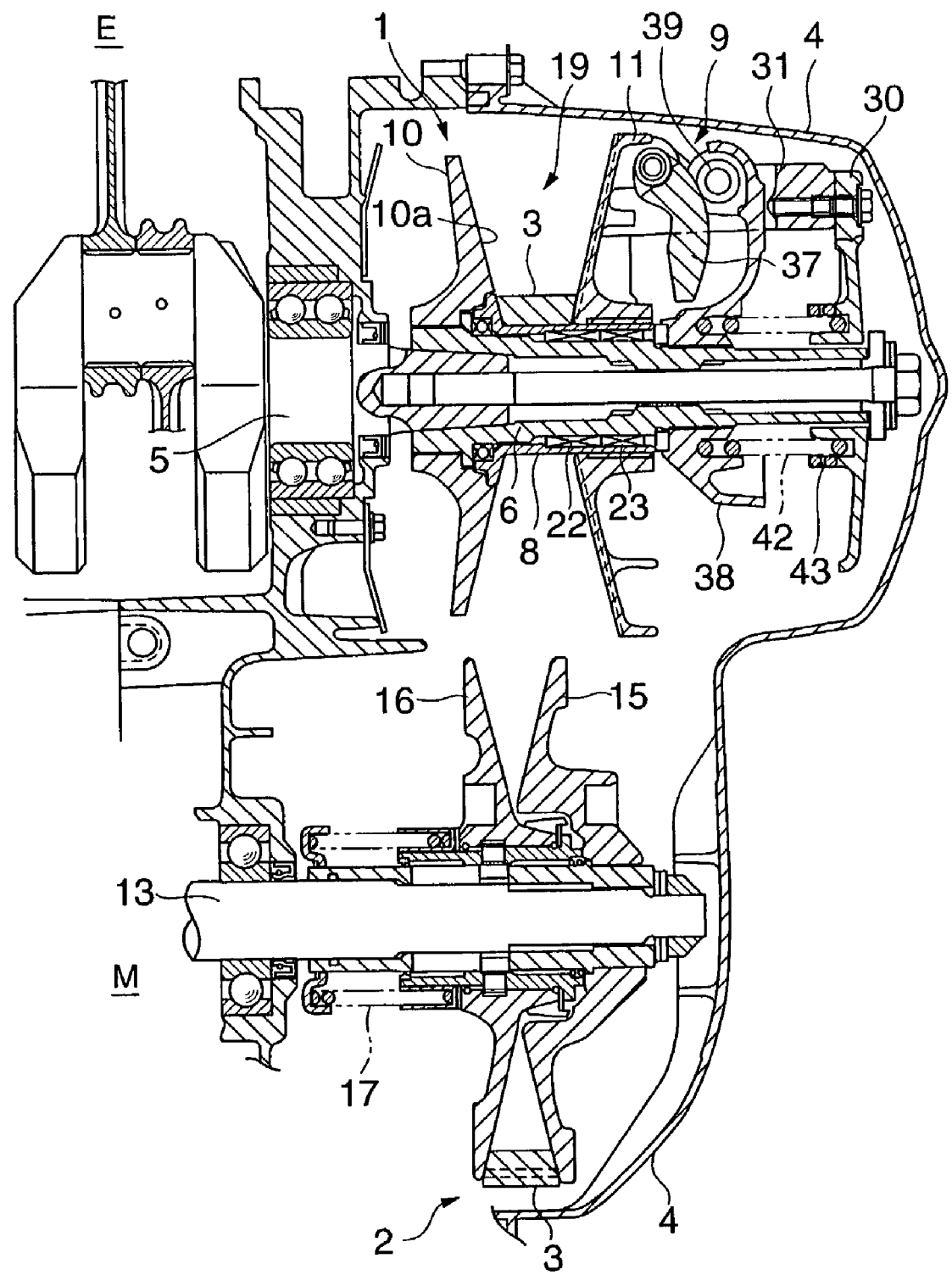
FIG. 1 is a longitudinal sectional view of an automotive V-belt nonstage transmission in a preferred embodiment according to the disclosure.
Figure 2:
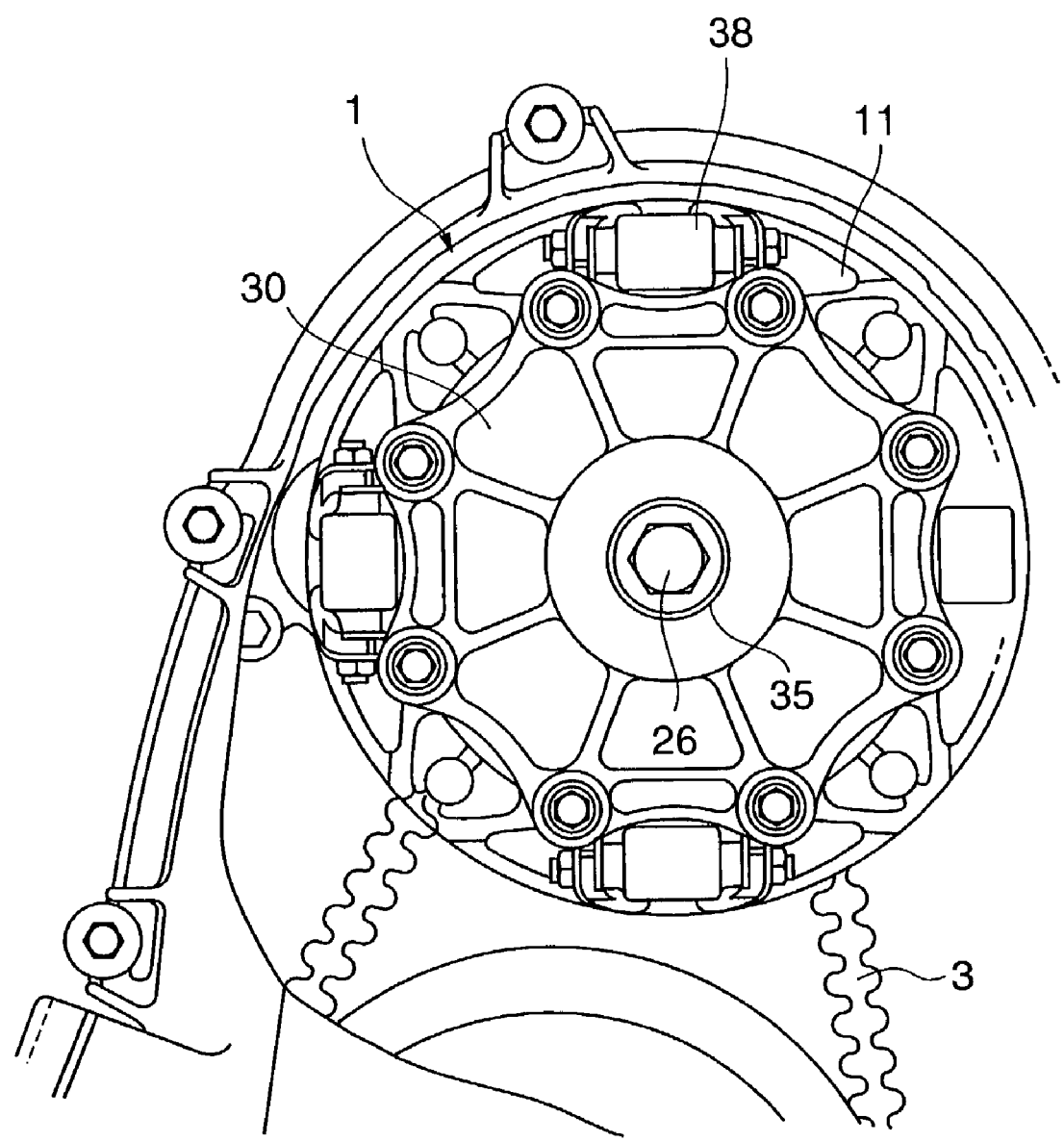
FIG. 2 is a partly cutaway side elevation of a drive pulley shown in FIG. 1 taken from the right side of the drive pulley.
Figure 7:
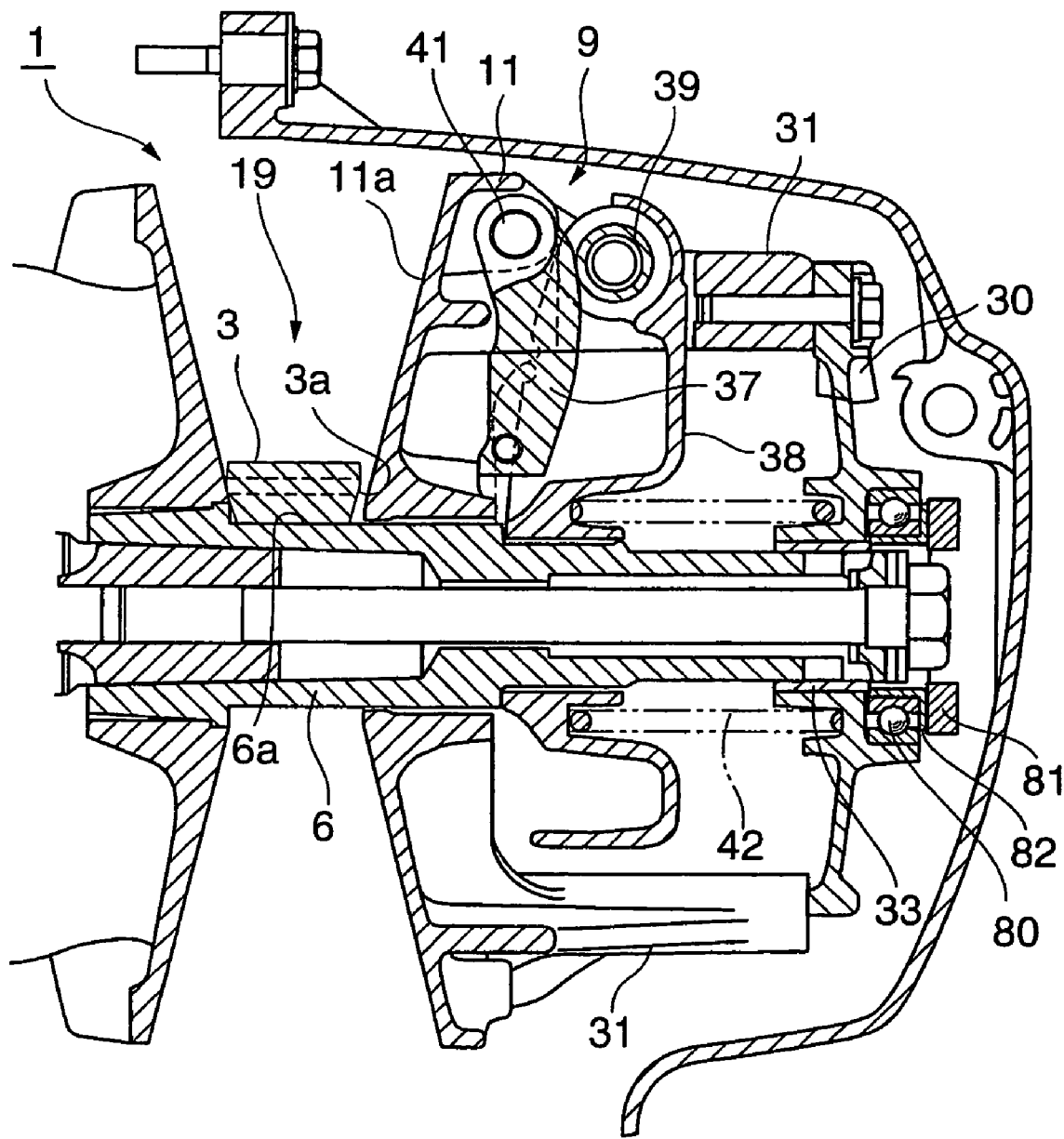
FIG. 7 is a longitudinal sectional view of a drive pulley included in a known automotive v-belt nonstage transmission.
Figure 8:
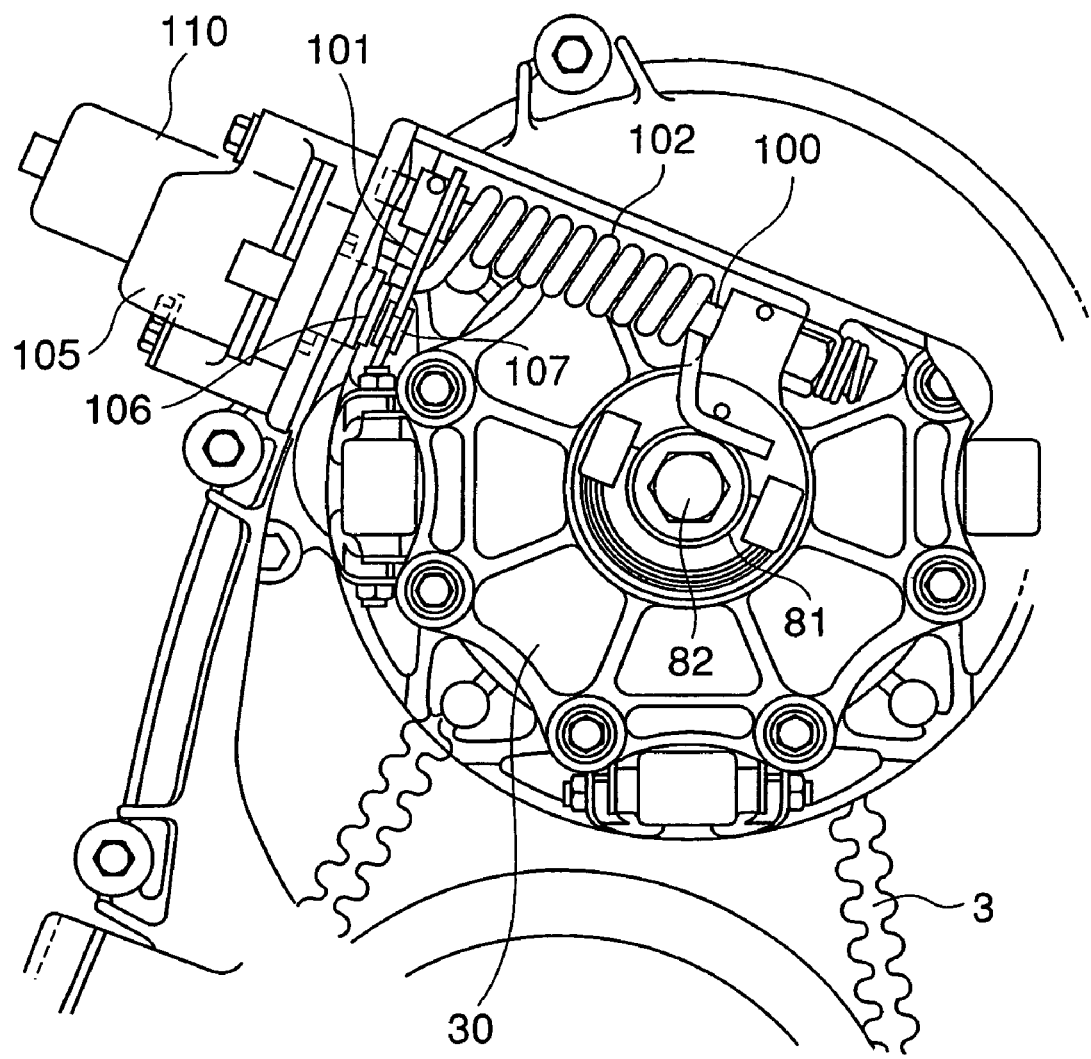
FIG. 8 is a partly cutaway side elevation of the drive pulley shown in FIG. 7 taken from the right side.

FIG. 1 shows an automotive V-belt nonstage transmission in a preferred embodiment according to the disclosure, in which parts like or corresponding to those shown in FIG. 7 are denoted by the same reference characters.

Automotive V-belt Nonstage Transmission

The Automotive V-belt nonstage transmission has a drive pulley 1, a driven pulley 2 and a V belt 3 extended between the drive pulley 1 and the driven pulley 2. The automotive V-belt nonstage transmission is covered with a transmission cover 4. The drive pulley 1 includes a drive shaft 6 coupled with the crankshaft 5 of an engine E, a fixed sheave 10, a movable sheave 11 axially movable on the drive shaft 6, a flyweight mechanism 9, and a clutch mechanism including a collar 8 and a one-way clutch 22. The driven pulley 2 includes a driven shaft 13 connected to the input shaft of a transmission M, a fixed sheave 15 screwed on the driven shaft 13, and a movable sheave 16 capable of helically moving on the driven shaft 13. The movable sheave 16 is pushed toward the fixed sheave 15 by a spring 17 to keep the driven pulley 2 in the greatest effective radius.

Drive Pulley 1

Figure 3:
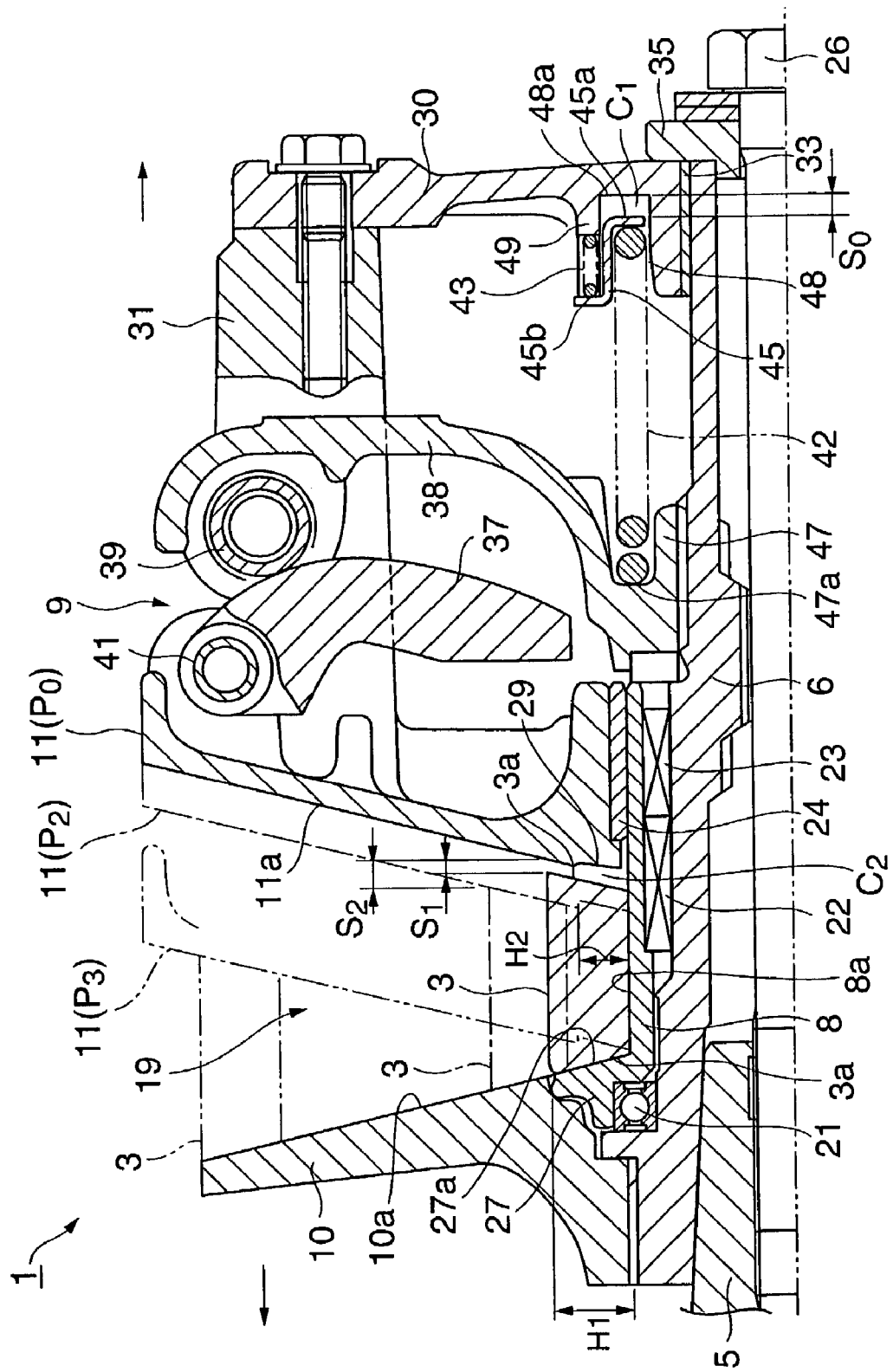
FIG. 3 is an enlarged, longitudinal, half sectional view of the drive pulley shown in FIG. 1 in a state where an engine is stopped.

Referring to FIG. 3 showing the drive pulley 1 in an enlarged, longitudinal, half sectional view, the drive shaft 6 is a hollow shaft having a tapered bore. The drive shaft 6 is put on a tapered end part of the crankshaft 5 and is fastened to the crankshaft 5 with a bolt 26. In the following description, it is assumed that the left side of the automotive V-belt nonstage transmission is on the side of the engine E to facilitate explanation. The fixed sheave 10 is screwed on a left end part of the drive shaft 6, and the collar 8 is disposed on the right side of the fixed sheave 10 rotatably relative to the fixed sheave. A flange 27 is formed integrally with the left end of the collar 8. The left end flange 27 is supported by a sealed ball bearing 21 on the drive shaft 6. A right end part of the collar 8 is supported by a sealed needle bearing 23 on the drive shaft 6. The collar 8 is interlocked with the drive shaft 6 by a one-way clutch 22 disposed between the bearings 21 and 23 and between the drive shaft 6 and the collar 8. The one-way clutch 22 transmits only the torque of the collar 8 acting in the normal rotating direction, i.e., the rotating direction of the crankshaft 5, to the drive shaft 6 and does not transmit the torque of the drive shaft 6 acting in the normal rotating direction to the collar 8. A space between the bearings 21 and 23 is filled with grease. The movable sheave 11 is supported by a bearing metal 24 on a outer peripheral surface 8a of the collar 8. The movable sheave 11 is axially movable and rotatable relative to the collar 8. The fixed sheave 10 has a conical pressure surface 10a and the movable sheave 11 has a conical pressure surface 11a. The conical pressure surfaces 10a and 11a, and a conical surface 27a formed in the flange 27 of the collar 8 define a V-groove 19 in which the V belt 3 engages.

Collar 8

The conical surface 27a of the flange 27 of the collar 8 forms a part of a conical pressure surface on the side of the fixed sheave 10; that is, the conical pressure surface on the side of the fixed sheave 10 consists of the conical pressure surface 10a of the fixed sheave 10 and the conical surface 27a of the flange 27 of the collar 8. The conical surface 27a of the flange 27 forms a central part of the conical pressure surface on the side of the fixed sheave 10. The outer peripheral surface 8a of the collar 8 serves as a bottom surface of the V-groove 19. The conical pressure surface 10a of the fixed sheave 10 rotates always together with the drive shaft 6, whereas the conical surface 27a and the outer peripheral surface 8a of the collar 8 rotate together with the drive shaft 6 only when the one-way clutch 22 is engaged. A height $H_1$ of the conical surface 27a of the collar 8 from the bottom surface of the V-groove, i.e., the outer periphery surface 8a of the collar 8, is approximately equal to the height of the side contact surfaces 3a of the V belt 3.

Movable Sheave 11

A central part (a part near the collar) of the conical pressure surface 11a of the movable sheave 11 is recessed to form a recess 29 extending radially around the collar 8. A radius of the recess 29, from the bottom of the V-groove, i.e., the outer peripheral surface 8a of the collar 8, is substantially equal to ⅔ of the height of the side contact surfaces 3a of the V belt 3. A disk-shaped support plate 30 is connected to the back surface of the movable sheave 11 by a plurality of connecting arms 31. The support plate 30 is supported for axial movement by a bearing metal 33 on the drive shaft 6. The rightward axial movement of the support plate 30 is limited by a stop ring 35 fastened to the right end of the drive shaft 6. Thus, the stop ring 35 determines the inoperative position $P_0$ of the movable sheave 11.

Flyweight Mechanism 9

The flyweight mechanism 9 placed between the back surface of the movable sheave 11 and the support plate 30 and includes flyweights 37, a spider 38 and rollers 39. The spider 38 is integrally provided with a plurality of radial arms, and is screwed on the drive shaft 6. The radial arms of the spider 38 engage circumferentially with the connecting arms 31. Thus, the movable sheave 11 is rotated always together with the drive shaft 6 by the spider 38. The flyweights 37 are pivotally supported by pins 41 on the movable sheave 11 so as to be in contact with the rollers 39. The flyweights 37 are turnable radially outward and inward on the pins 41.

Return Coil Spring 42 and Auxiliary Coil Spring 43

A return coil spring 42 and an auxiliary coil spring 43 are provided between the spider 38 and the support plate 30.

The return coil spring 42 counterbalances centrifugal forces acting on the flyweights 37 to control speed-change ratio. The auxiliary coil spring 43 has a resilient force lower than that of the return coil spring 42 and counterbalances centrifugal of forces acting on the flyweights, while the engine E is idling. The auxiliary coil spring 43 controls the movement of the movable sheave 11 such that the vehicle may not creep while the engine E is idling. The return coil spring 42 and the auxiliary coil spring 43 are functionally connected in series by an annular connecting member 45 having a stepped cross section.

Annular grooves 47 and 48 are formed in respective central parts of the spider 38 and the support plate 30, respectively. The return coil spring 42 has a left end in contact with a bottom surface 47a of the annular groove 47 of the spider 38, and a right end in contact with an inside flange 45a of the annular connecting member 45. The auxiliary coil spring 43 is shorter than the return coil spring 42, is disposed so at to surround a right end part of the return coil spring 42, and is compressed between an outside flange 45b of the annular connecting member 45 and an annular ridge 49 formed on the support plate 30. A clearance $C_1$ of a predetermined length $S_0$ is formed between the inside flange 45a and the bottom surface 48a of the annular groove 48 of the support plate 30. The respective resilient forces of the auxiliary coil spring 43 and the return coil spring 42 are determined such that only the auxiliary coil spring 43 is compressed while the support plate 30 moves leftward from the right end position shown in FIG. 3 through a distance corresponding to the length $S_0$, and the return coil spring 42 starts being compressed after the bottom surface 48a of the annular groove 48 of the support plate 30 has come into contact with the inside flange 45a of the annular connecting member 45. The length $S_0$ is longer than the width $S_1$ of a gap $C_2$ between the conical pressure surface 11a of the movable sheave 11 staying at an inoperative position $P_0$, i.e., a rightmost position as viewed in FIG. 3, and the right side contact surface 3a of the V belt 3 in a state where the engine E is stopped, and is shorter than the distance $S_2$ of movement of the movable sheave 11 from the inoperative position $P_0$ to a starting position $P_2$ indicated by chain lines where the movable sheave 11 engages with the V belt 3 effectively to start the vehicle.

State Where the Engine E is Stopped

Positions of the components of the automotive V-belt nonstage transmission while the engine E is stopped are indicated by continuous lines in FIG. 3. Since the drive shaft 6 is stationary, any centrifugal force does not act on the flyweights 37, the movable sheave 11 is held at the inoperative position $P_0$ by the return coil spring 42 and the auxiliary coil spring 43, and the support plate 30 is pressed against the stop ring 35. The gap $C_2$ of the predetermined width $S_1$ is formed between the conical pressure surface 11a and the right side contact surface 3a of the V belt 3 and the clutch mechanism is disengaged.

State after the Start of the Engine E

When the engine E is started in a state shown in FIG. 3, the flyweights 37 starts turning radially outward and, consequently, the movable sheave 11 and the support plate 30 are moved from the inoperative position $P_0$ to the left, compressing only the auxiliary coil spring 43.

State Where the Engine E is Idling

Figure 4:
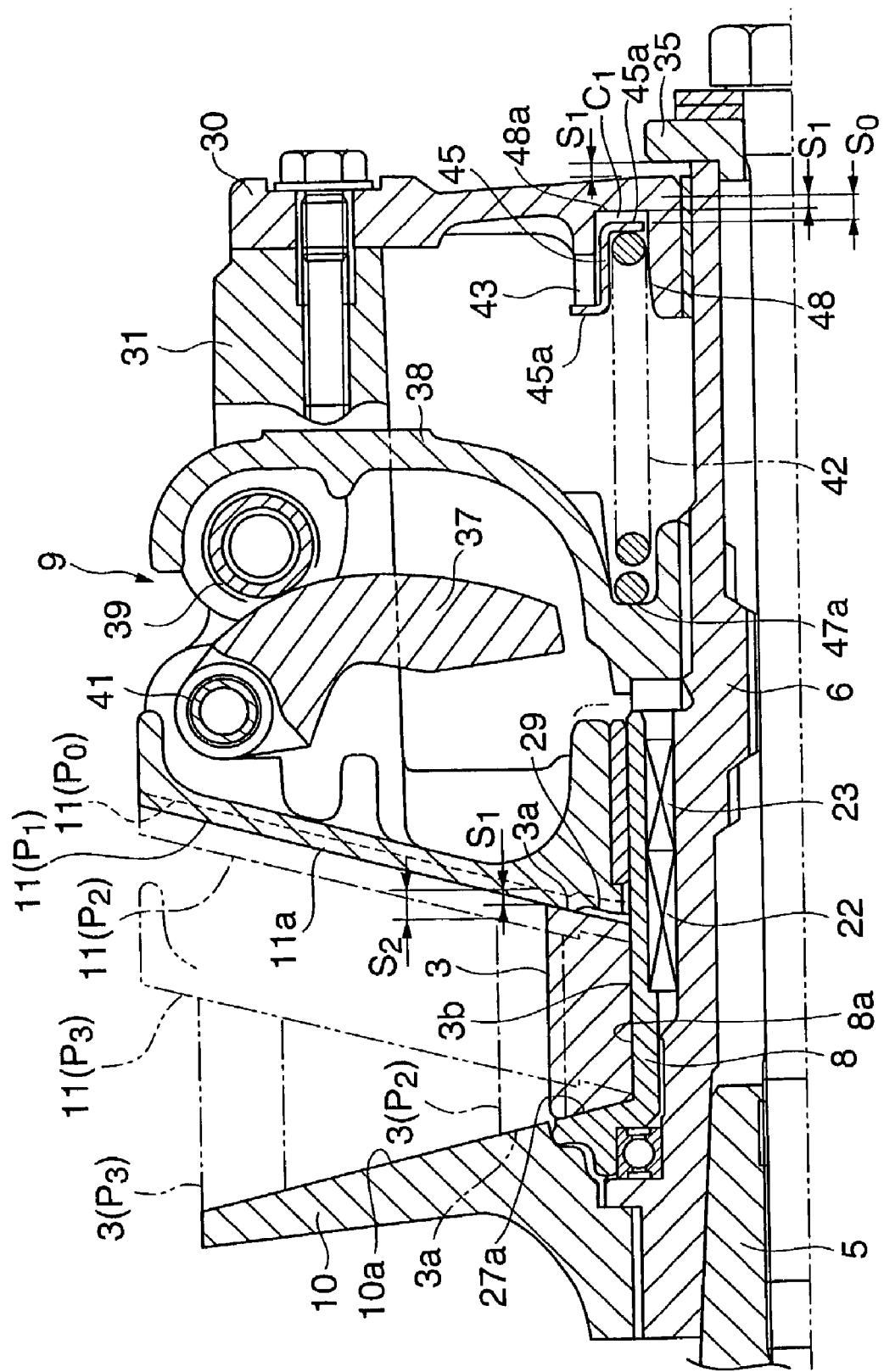
FIG. 4 is an enlarged, longitudinal, half sectional view of the drive pulley shown in FIG. 1 in a state where the engine is idling.

Positions of the components of the automotive V-belt nonstage transmission while the engine E is idling are indicated by continuous lines in FIG. 4. When the engine speed increases to an idling speed in the range of, for example, 900 to 1000 rpm after the engine E has been started, the movable sheave 11 is shifted from the inoperative position $P_0$ indicated by dotted lines to an idling position $P_1$ and the conical pressure surface 11a of the movable sheave 11 is in contact with the right side contact surface 3a of the V belt 3. At this stage, the return coil spring 42 is not yet compressed and the length $S_0$ of the clearance $C_1$ between the inside flange 45a of the annular connecting member 45 and the bottom surface 48a of the annular groove 48 is reduced by a distance corresponding to the width $S_1$. In the state shown in FIG. 4, the collar 8 and the V belt 3 remain stationary while the vehicle is stopped because the drive shaft 6 and the collar 8 are interlocked by the one-way clutch 22 that does not transmit the torque of the drive shaft 6 to the collar 8. On the other hand, the movable sheave 11 in contact with the V belt 3 is rotating together with the drive shaft 6 and hence the torque of the engine E can be transmitted to the V belt 3. However, since the pressure adjusted by the auxiliary coil spring 43 presses the movable sheave 11 against the V belt 3, and the conical pressure surface 11a of the movable sheave 11 has the recess 29, the creep of the vehicle is limited to the least unavoidable extent even if the transmission M (FIG. 1) is set for a forward speed or reverse.

Start of the Vehicle

Referring to FIG. 4, as the engine speed increases beyond the idling speed, centrifugal force acting on the flyweights 37 increases accordingly. Then, the movable sheave 11 is shifted further leftward from the idling position $P_1$ and pushes the V belt 3 radially outward to start increasing the effective radius of the drive pulley 1. Upon the increase of the engine speed to a predetermined starting engine speed, such as 1400 rpm, the movable sheave 11 is shifted to a starting position $P_2$ indicated by chain lines, and most part of the left side contact surface 3a of the V belt 3 is pressed against the pressure surface 10a of the fixed sheave 10 as indicated by chain lines. Thus, both the side contact surfaces 3a of the V belt 3 are frictionally engaged with the respective pressure surfaces 10a and 11a of the fixed sheave 10 and the movable sheave 11, the torque of the engine E is transmitted from the sheaves 10 and 11 of the drive pulley 1 to the V belt 3 and the vehicle starts running.

As the movable sheave 11 moves from the inoperative position $P_0$ to the starting position $P_2$, the bottom surface 48a of the annular groove 48 comes into contact with the inside flange 45a of the annular connecting member 45 to start compressing the return coil spring 42. Thus, the speed-change ratio of the automotive V-belt nonstage transmission varies according to the balance of the resilient force of the return coil spring 42 and the centrifugal force acting on the flyweights 37 while the movable sheave 11 moves to a high-speed position $P_3$, i.e., a leftmost position as viewed in FIG. 3, indicated by two-dot chain lines for a minimum speed-change ratio, i.e., a minimum ratio of the rotating speed of the drive pulley 1 to that of the driven pulley 2 after the vehicle has started running.

Engine Braking While the Engine is Idling

If the wheels of the vehicle start driving the automotive V-belt nonstage transmission while the vehicle is moving forward or backward down a slope with the transmission M (FIG. 1) set in a forward speed or reverse, the engine E idling, and the movable sheave 11 at the idling position shown in FIG. 4, the torque of the wheels is transmitted through the driven shaft 13 (FIG. 1), the driven pulley 2 and the V belt 3 to the drive pulley 1. Then, the V belt 3 tries to increase the rotating speed of the drive shaft 6. Since the collar 8 is interlocked with the drive shaft 6 by the one-way clutch 22, the revolution of the V belt 3 in contact with the conical pressure surface 11a of the movable sheave 11, and the conical surface 27a and the outer periphery surface 8a of the collar 8 is transmitted through the movable sheave 11 and the collar 8 to the drive shaft 6, and through the one-way clutch 22 to the drive shaft 6. Consequently, engine brake is effectuated while the vehicle is moving down a slope with the engine E idling.

Engine Braking at Engine Speed Higher than Idling Speed

When the vehicle is running down a slope with the movable sheave 11 positioned between the starting position $P_2$ and the high-speed position $P_3$, the torque of the wheels is transmitted through the V belt 3 to the fixed sheave 10 and the movable sheave 11 in contact with the side contact surfaces 3a of the V belt 3. Since the fixed sheave 10 and the movable sheave 11 are interlocked with the drive shaft 6 with respect to rotating direction, engine brake is effectuated.

Figure 5:
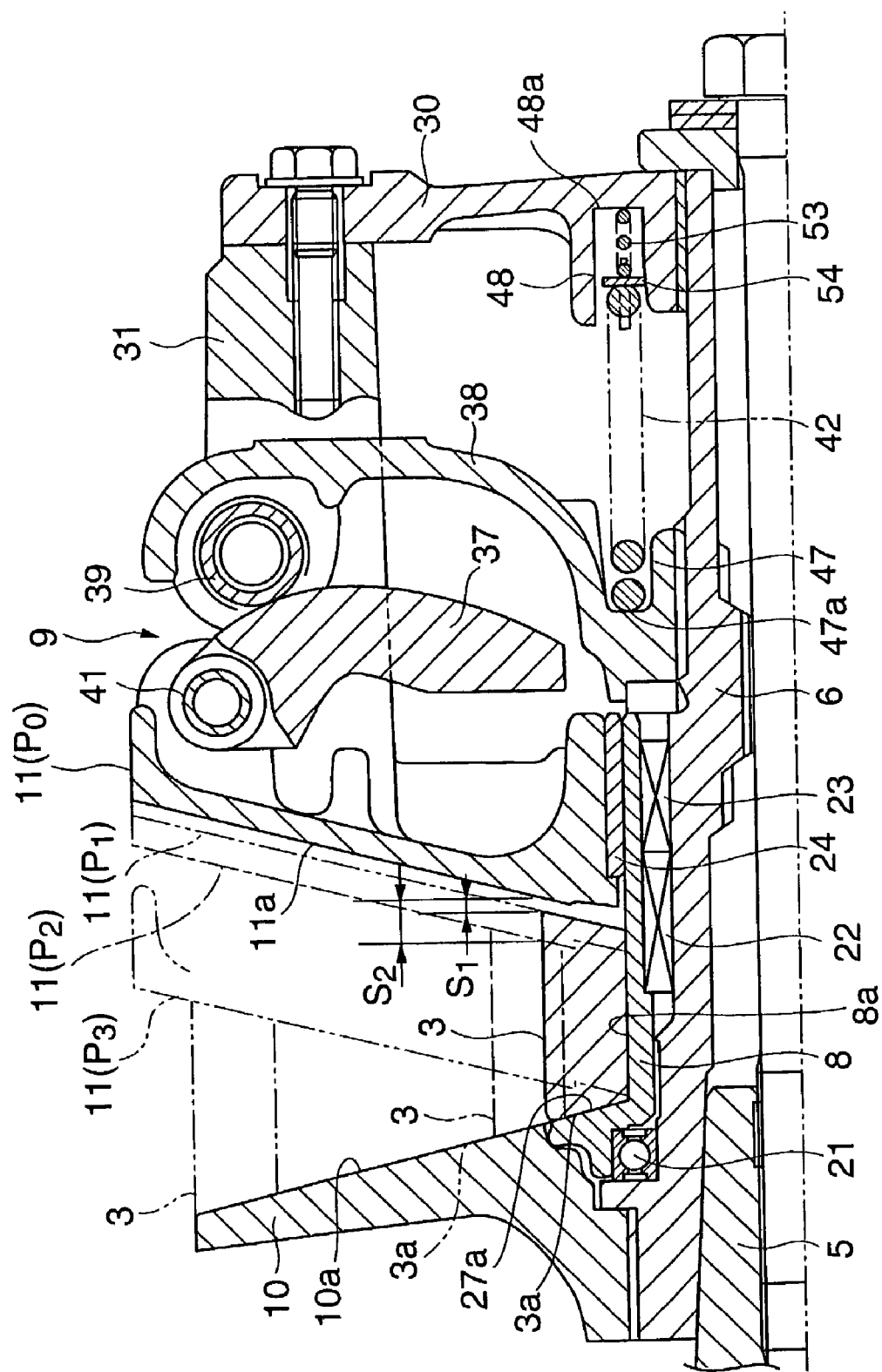
FIG. 5 is an enlarged, longitudinal, half sectional view, similar to FIG. 3, of an automotive V-belt nonstage transmission provided with an auxiliary coil spring in a modification in a state where the engine is stopped.

Modifications (1) FIG. 5 shows an automotive V-belt nonstage transmission in a first modification employing an auxiliary coil spring 53, in which parts like or corresponding to those shown in FIG. 3 are denoted by the same reference characters. The auxiliary coil spring 53 is compressed between an annular connecting member 54 in contact with the right end of a return coil spring 42 and the bottom surface 48a of an annular groove formed in a support plate 30. The auxiliary coil spring 53 has a resilient force lower than that of the return coil spring 42, such that only the auxiliary coil spring 53 is compressed at least while a movable sheave 11 is moving through a distance $S_1$ from an inoperative position $P_0$ to an idling position $P_1$, and the return coil spring 42 starts being compressed before the movable sheave 11 reaches a starting position $P_2$. The automotive V-belt nonstage transmission shown in FIG. 5 is identical in other respects with that shown in FIG. 3.

Figure 6:
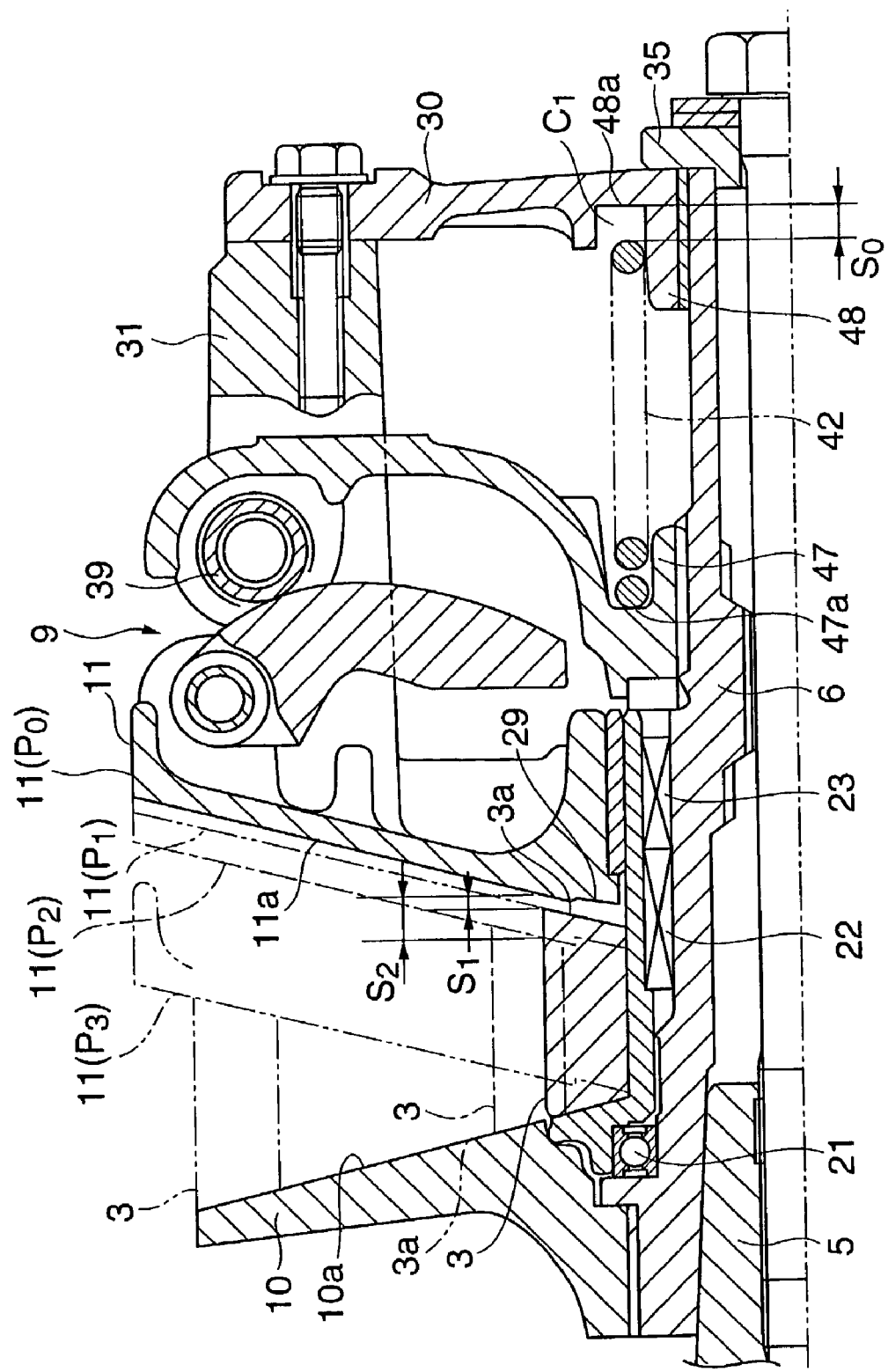
FIG. 6 is an enlarged, longitudinal, half sectional view, similar to FIG. 3, of an automotive V-belt nonstage transmission not provided with any auxiliary coil spring in a state where the engine is stopped.

(2) FIG. 6 shows a automotive V-belt nonstage transmission in a second modification not provided with any part corresponding to the auxiliary coil spring 43 or 53, in which parts like or corresponding to those shown in FIG. 3 are denoted by the same reference characters. A gap $C_1$ of a length $S_0$ is formed between the right end of a return coil spring 42 and the bottom surface 48a of an annular groove formed in a support plate 30. The return coil spring 42 is not compressed while a movable sheave 11 is moving through the length $S_1$ from an inoperative position $P_0$ to an idling position $P_1$, and the return coil spring 42 starts being compressed before the movable sheave 11 reaches a starting position P2. The automotive V-belt nonstage transmission shown in FIG. 6 is identical in other respects with that shown in FIG. 3.

(3) The auxiliary coil spring 53 shown in FIG. 5 may be compressed between the bottom surface 47a of the annular groove 47 formed in the spider 38 and the left end of the return coil spring 42.

Although the disclosure has been described in its preferred form with a certain degree of particularity, obviously many changes and variations are possible therein. It is therefore to be understood that the disclosure may be practiced otherwise than as specifically described herein without departing from the scope and spirit thereof.

What is claimed is:

1. An automotive V-belt nonstage transmission, comprising:
   a drive pulley having a fixed sheave fixedly mounted on a drive shaft so as to move integrally with the drive shaft and having a conical pressure surface, a movable sheave mounted on the drive shaft, restrained from rotation relative to the drive shaft, capable of axially moving on the drive shaft and having a conical pressure surface;
   a driven pulley;
   a V-belt extended between the drive and the driven pulley;
   a return coil spring pushing the movable sheave of the drive pulley so as to part from the fixed sheave;
   a flyweight mechanism capable of pushing the movable sheave of the drive pulley toward the fixed sheave of the drive pulley as rotating speed of the drive shaft increases; and
   a clutch mechanism including a collar being rotatable relative to the fixed and movable sheaves and mounted rotatably on the drive shaft, and a one-way clutch mounted between the drive shaft and the collar, interlocking the collar and the drive shaft and capable of transmitting only rotation of the collar in the normal rotating direction to the drive shaft, and
   the collar having an outer periphery surface serving as a bottom surface of a V-groove defined by the respective conical pressure surfaces of the fixed and the movable sheave of the drive pulley, and a conical surface forming a conical pressure surface corresponding to a central part, around the drive shaft, of the conical pressure surface of the fixed sheave of the drive pulley.

2. The automotive V-belt nonstage transmission according to claim 1, further comprising an auxiliary coil spring capable of counterbalancing centrifugal force produced by the flyweight mechanism while an engine driving the drive shaft is operating at an idling speed in which the movable sheave of the drive pulley is at least in contact with a side contact surface of the V-belt, and wherein the return coil spring and the auxiliary coil spring are connected in series.

3. The automotive V-belt nonstage transmission according to claim 2, wherein the auxiliary coil spring has a resilient force lower than that of the return coil spring.

4. The automotive V-belt nonstage transmission according to claim 2, wherein the auxiliary coil spring surround a part of the return coil spring, and the return coil spring and the auxiliary coil spring are connected in series by an annular connecting member having a stepped cross section.

5. The automotive V-belt nonstage transmission according to claim 1, wherein a central part of the conical pressure surface of the movable sheave is recessed to form a recess extending radially around the collar, and a radial of the recess being smaller than a height of the V-groove.

6. The automotive V-belt nonstage transmission according to claim 5, wherein the radial height of the recess is equal to about ⅔ of the height of the V belt.

7. The automotive V-belt nonstage transmission according to claim 1, wherein a radial height of the conical surface of the collar is substantially equal to the height of the V belt.

\* \* \* \* \*